(No Model.) 4 Sheets—Sheet 1.
E. ZIMMERMANN, A. SCHMID & G. WUNDERLE.
TUBULAR CUTTER LATHE.
No. 420,982. Patented Feb. 11, 1890.
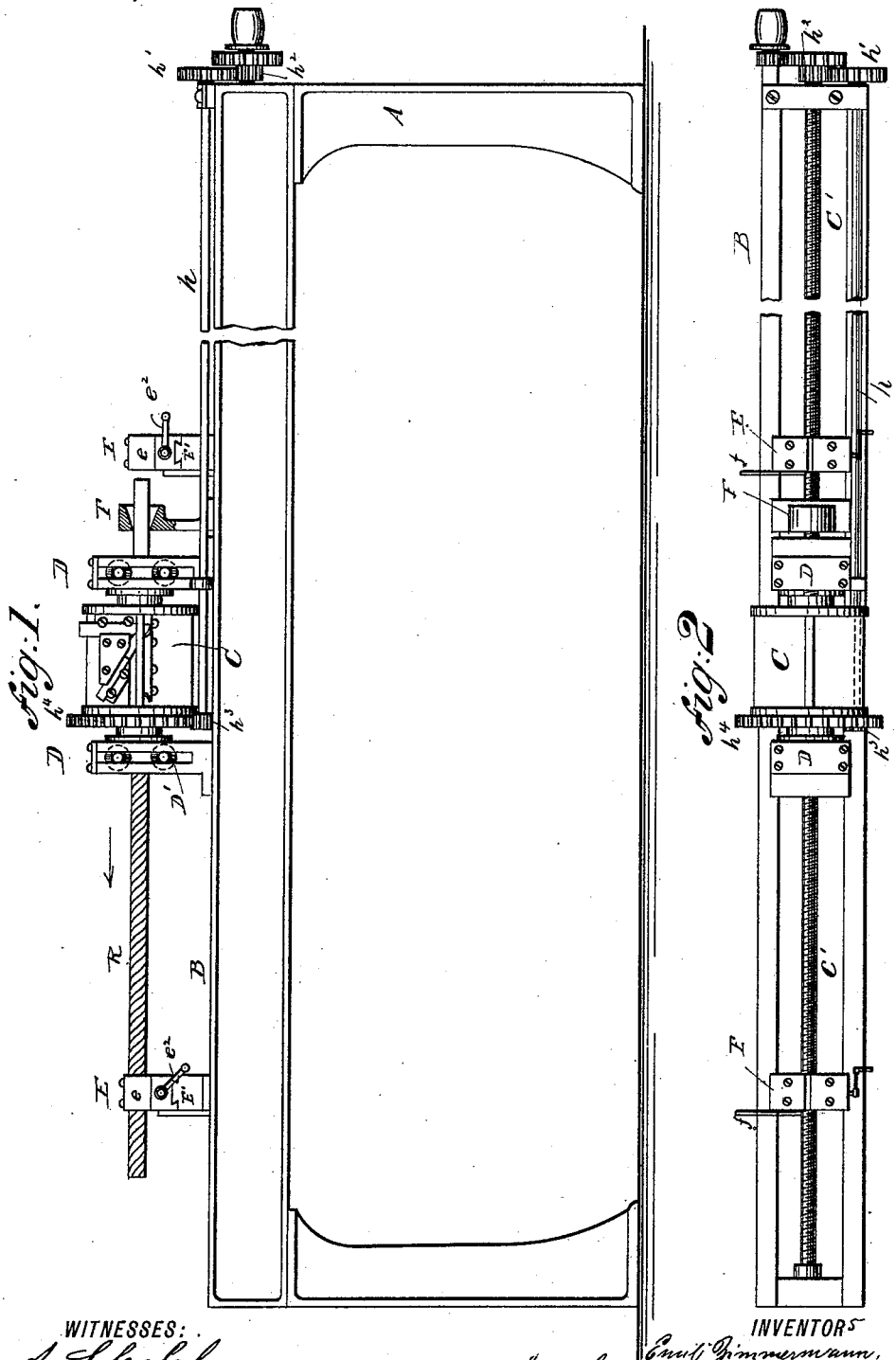
WITNESSES:
A. Schehl.
Carl Key
INVENTORS
Emil Zimmermann,
Aug Schmid and Geo. Wunderle
BY
Goepel & Jaeger
ATTORNEYS

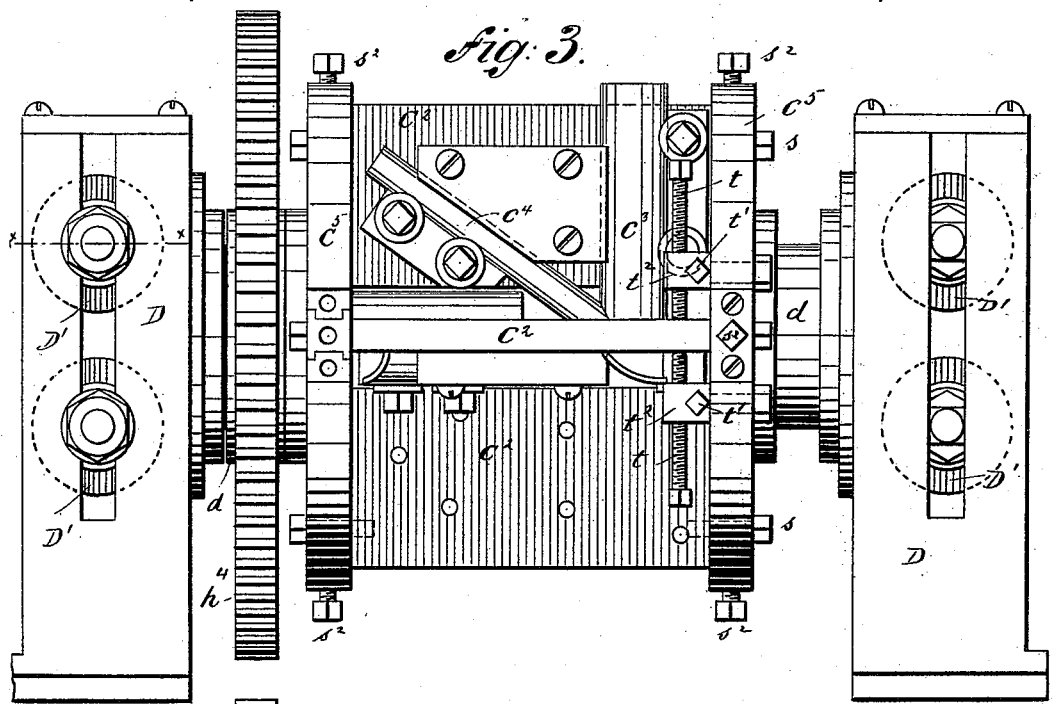
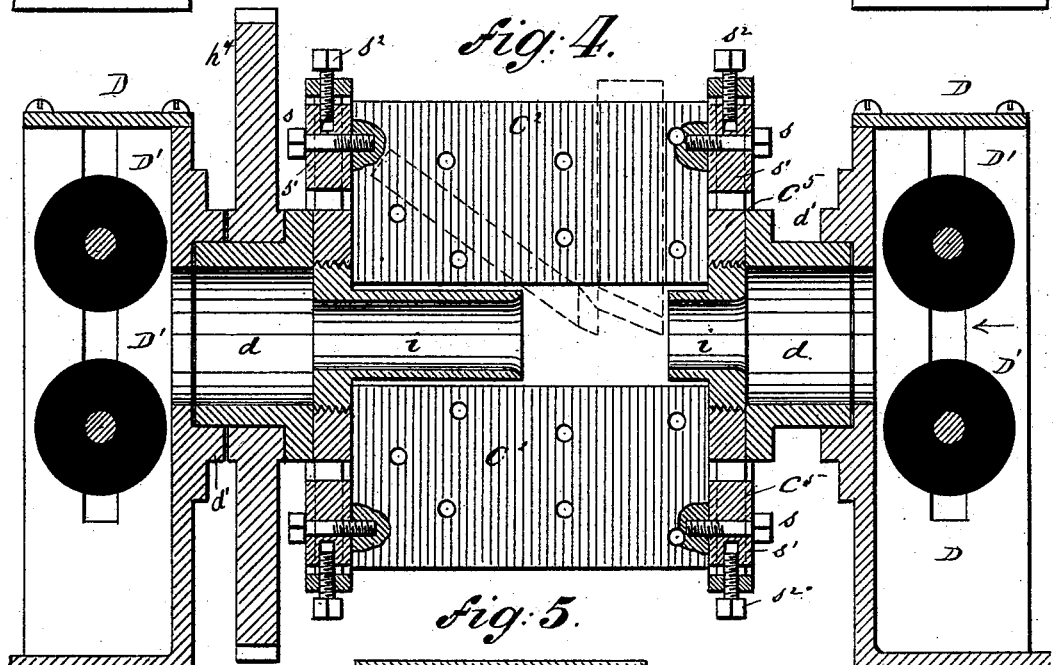
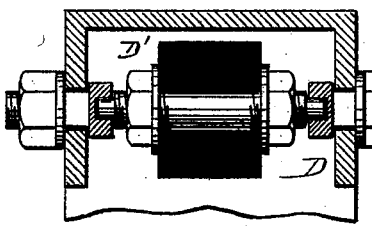

(No Model.) 4 Sheets—Sheet 3.

E. ZIMMERMANN, A. SCHMID & G. WUNDERLE.
TUBULAR CUTTER LATHE.

No. 420,982. Patented Feb. 11, 1890.

WITNESSES:
A. Schehl.
Carl Kay

INVENTORS
Emil Zimmermann, August
Schmid and Gerh. Wunderle
BY Goepel & Waegner
ATTORNEYS.

(No Model.) 4 Sheets—Sheet 4.
E. ZIMMERMANN, A. SCHMID & G. WUNDERLE.
TUBULAR CUTTER LATHE.

No. 420,982. Patented Feb. 11, 1890.

WITNESSES:
A. Schehl.
Carl Kus

INVENTORS
Emil Zimmermann, August
Schmid and Gah. Wunderle
BY
Goepel & Naegner
ATTORNEYS

UNITED STATES PATENT OFFICE.

EMIL ZIMMERMANN, AUGUST SCHMID, AND GERHARD WUNDERLE, OF NEW YORK, N. Y., ASSIGNORS TO F. E. ZIMMERMANN & CO., OF SAME PLACE.

TUBULAR CUTTER-LATHE.

SPECIFICATION forming part of Letters Patent No. 420,982, dated February 11, 1890.

Application filed April 24, 1889. Serial No. 308,456. (No model.)

*To all whom it may concern:*

Be it known that we, EMIL ZIMMERMANN, AUGUST SCHMID, and GERHARD WUNDERLE, of the city, county, and State of New York, citizens of the German Empire, have invented certain new and useful Improvements in Tubular Cutter-Lathes, of which the following is a specification.

This invention relates to an improved tubular cutting-lathe for making wooden spirals or so-called "twisted poles" in a quick and effective manner; and the invention consists of a tubular cutter-lathe in which a rotary tubular cutter provided with a like number of adjustable cutters as there are spirals to be cut into a blank is arranged in connection with two longitudinally-traversing clamps—one on each side of the tubular cutter—and with elastic guide-rollers arranged at each end of the cutter-lathe for causing the steady motion of the blank through the cutter by the action of a pushing or drawing clamp. The tubular cutter is rotated on its axis by a suitable gear-wheel transmission and the blank simultaneously moved through the tubular cutter by the clamps which traverse in a longitudinal direction on a rotary screw-spindle, to which the carriage of the clamp is applied by suitable mechanism.

The invention further consists of certain details of construction and combination of parts, which will be fully described hereinafter, and finally pointed out in the claims.

Figure 6:
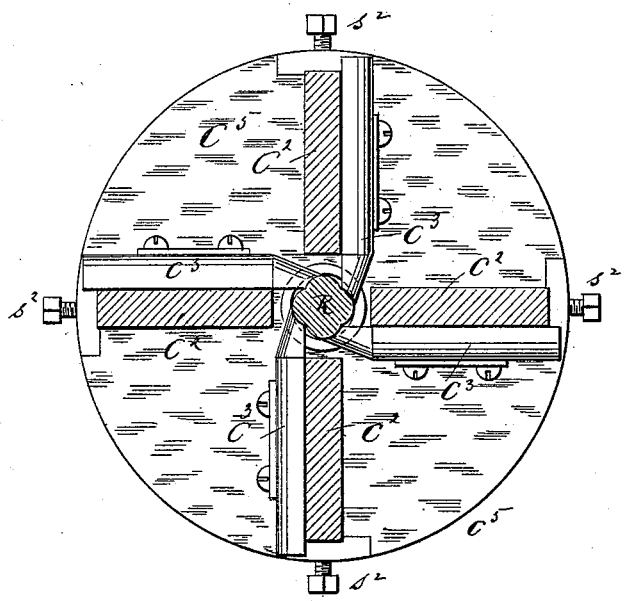
Figure 7:
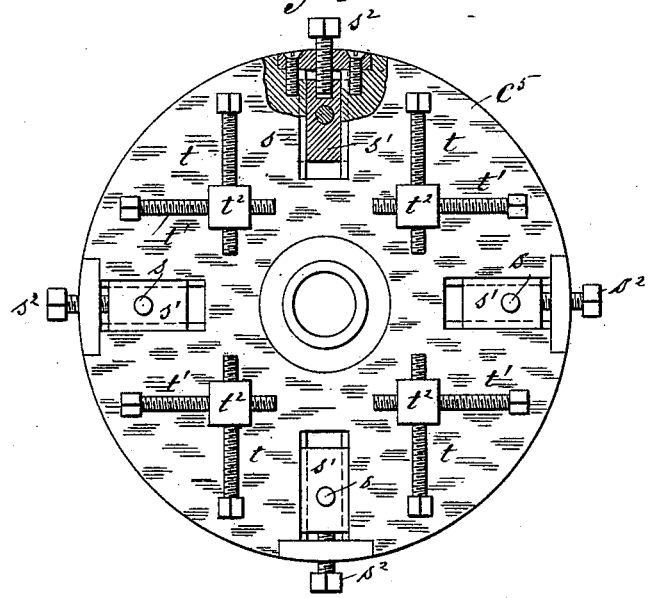
Figure 8:
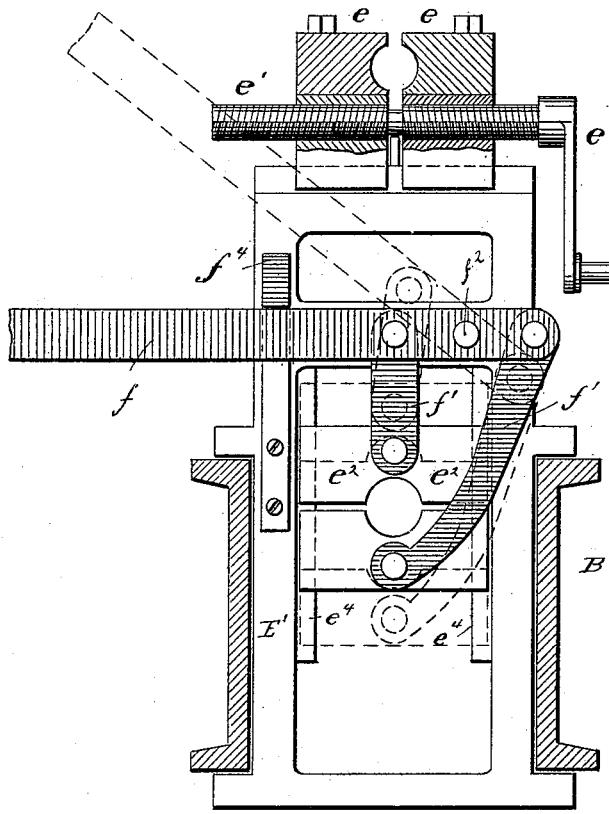
Figure 9:
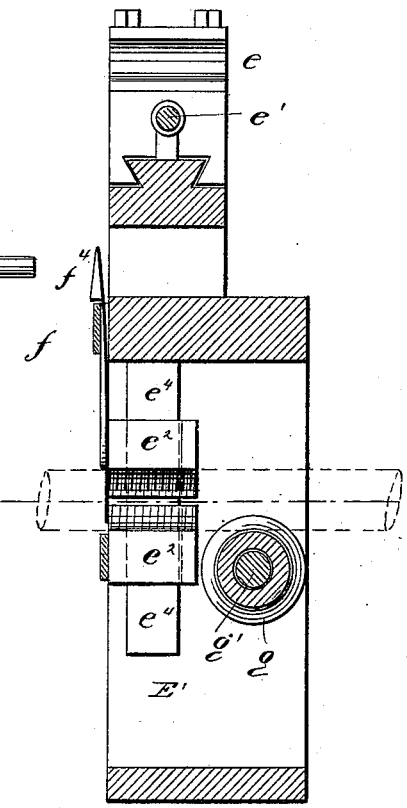
Figure 10:
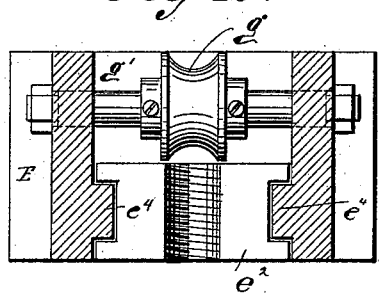

In the accompanying drawings, Figure 1 represents a side elevation of our improved tubular cutter-lathe, parts being broken out. Fig. 2 is a plan of the same, parts being broken out. Fig. 3 is a side elevation of the tubular cutting-lathe, drawn on a larger scale. Fig. 4 is a vertical longitudinal section of the cutter-lathe with the cutting-knives removed from the same for the sake of clearness. Fig. 5 is a detail horizontal section on line $xx$, Fig. 3, of the elastic guide-rollers. Figs. 6 and 7 are respectively a vertical transverse section through the cutter-lathe and the inside elevation of one of the heads of the same, the latter being partly in section; and Figs. 8, 9, and 10 are details of the blank-holding clamp and its supporting-carriage and the means by which the carriage is applied to or disconnected from the rotary screw-spindle.

Similar letters of reference indicate corresponding parts.

Referring to the drawings, A represents the supporting-frame of our improved tubular cutter-lathe, which supporting-frame is provided at the top part with guideways B. In the bearings on the end standards of the frame A is supported a longitudinal screw-spindle C', which receives rotary motion by a suitable gear-wheel transmission from a pulley that is driven by a power-belt. About midway between the end standards of the supporting-frame A is supported on the ways B a rotary cutter-lathe C, which is arranged to turn on its tubular ends $d$ in bearings $d'$ of the fixed upright standards D D, between the slotted side walls of which are mounted the bearings or elastic guide-rollers D', as shown clearly in Figs. 3 and 5.

On the ways B are supported the traversing blank-holding clamps E E, which are each formed of a carriage E', which is guided on the ways B and actuated by connection with the screw-spindle C' and two clamp-sections $e$, which are dovetailed in the top of the carriage. The clamp-sections $e$ $e$ are adjusted toward or from each other by means of a right and left hand screw-spindle $e'$, provided with a crank-handle $e^2$ at one end, said sections forming jaws by which the blank is tightly grasped, so as to be fed to the tubular lathe C. One longitudinally-traversing clamp E is arranged at each side of the cutter-lathe, one of the clamps E serving to push the blank R through the cutter-lathe until the same is spirally grooved to one-half or the greater part of its length, while the other clamp grips the finished end of the blank and serves to draw the ungrooved end of the blank through the cutter-lathe, so as to finish that end of the blank. Near the ingoing elastic guide-rollers of the cutter-lathe C is arranged a fixed upright standard F, having a tapering guide-opening, as shown in Fig. 1, which serves for guiding the end of the blank through between the ingoing rollers and into the rotary cutter-lathe.

The carriages of the clamps E are connected with the screw-spindle C' by means of nut-blocks $e^2$, which are semicircularly recessed and threaded at the middle parts of the inner edges for the passage of the screw-spindle, and are guided on vertical tongues $e^4$ of the carriage E'. A lever F is fulcrumed on the carriage at $f^2$ and connected by pivot-links $f'$, applied to the opposite sides of the fulcrum of the lever $f$, with the upper and lower nut-blocks $e^2$. When the lever $f$ is raised, as shown in dotted lines in Fig. 8, the blocks $e^2$ are moved away from the screw-spindle C', so as to release the same, and thereby the motion of the supporting-carriage of the clamp E is interrupted. By lowering the lever $f$ the threaded blocks $e^2$ are applied to the screw-spindle C' and the carriage moved forward on the ways B by the action of the rotary screw-spindle on the said threaded blocks. The lever F and thereby the blocks $e^2$ are retained in position by a spring locking-catch $f^4$, which engages the lever $f$, as shown in Figs. 3 and 9. The carriage E' of the clamp E is retained in connection with the screw-spindle C by a grooved roller $g$, that turns on a fixed shaft $g'$ of the carriage, said grooved roller being arranged below the screw-spindle and immediately back of the threaded blocks $e^2$.

The tubular cutting-lathe C is rotated by a longitudinal shaft $h$, which is arranged in bearings on the top of the supporting-frame A, and to which rotary motion is imparted by a gear-wheel $h'$, which meshes with a pinion $h^2$ on the rotary screw-spindle C. To one end of the rotary lathe C is applied a gear-wheel $h^4$, which meshes with a pinion $h^3$ on the shaft $h$, whereby rotary motion on its axis is imparted to the cutter-lathe.

The lathe is constructed with fixed interior guide-tubes $i\ i$—one at each end—said guide-tubes being screwed into the disk-shaped heads $C^5$ of the lathe C, which heads are supported by radial plates $C^2$, that are adjustably applied to the heads $C^5$ by means of pivot-screws $s$, applied near the outer edges of the plates, as shown in Figs. 4 and 7. The pivot-screws $s$ pass through guide-blocks $s'$, which are arranged in slots of the heads $C^5$, so that the radial plates $C^2$ may be adjusted in radial direction on the heads $C^5$ and retained in position by means of set-screws $s^2$, that pass through circumferential blocks of the heads $C^5$ and engage screw-sockets of the blocks $s'$. The inner ends of the plates $C^2$ are adjusted by means of screws $t\ t'$, which pass through fixed blocks $t^2$ on the inner sides of one of the heads $C^5\ C^5$. On each plate $C^2$ are arranged two knives or cutters $C^3\ C^4$—one radial to the axis of the lathe, the other at an inclination to the same—the shape of the cutters being so arranged as to produce the required shape of spiral grooves on the blank. The cutters $C^3$ and $C^4$ are adjusted and held by suitable blocks by means of clamp-screws in the usual manner, as shown in Figs. 3 and 6. By adjusting the plates $C^2$ a greater or less distance away from the axis of the lathe and at proper inclination to the blank, blanks of any suitable diameter may be grooved, the cutters being removed and sharpened from time to time, and then readjusted by the clamping and setting screws. When the end of the blank is introduced between the ingoing elastic rollers D' to the ingoing guide-box $i$ of the rotary cutter-lathe, the cutter-knives begin to cut into the same. As many sets of cutter-knives are arranged as there are grooves to be cut on the blank. In the drawings four pairs of cutters are shown, which are applied to four radial plates $C^2$, so as to cut four spiral grooves in the blank. The blank is pushed forward through the tubular cutter-lathe by the clamp E at one side of the same and spirally grooved by the joint action of the longitudinal forward motion of the blank and the axially-rotating motion of the cutter-lathe. When one-half or more of the blank is grooved by the action of the lathe, the clamp E at the other side of the same is applied to the end of the blank and the said clamp applied to the screw-spindle, so as to draw the remaining part of the blank through the cutter-lathe for completing the grooving of the blank. Both clamps E are then returned to their starting positions—one near the end of the supporting-frame, the other adjacent to the cutter-lathe. The next blank is applied to the clamp at the end of the supporting-frame and the end of the blank inserted into the ingoing rollers, and the clamp E at the end of the frame is applied to the screw-spindle, so that the same moves the blank into the cutter-lathe, as before. When the blank is grooved to about half its length, the traversing clamp E arrives near the standard F. This clamp is released from the blank and the clamp E at the other side of the cutter-lathe applied to the blank and to the screw-spindle, so as to be moved forward by the latter, whereby the blank is drawn through the cutter-lathe and the grooving of the same finished. In this manner spirally-grooved poles or so-called "twisted" poles can be manufactured in a quick and effective manner, all the grooves being cut at one and the same time by one passage through the cutter-lathe, thereby saving considerable time and labor.

Having thus described our invention, we claim as new and desire to secure by Letters Patent—

1. In a tubular cutter-lathe, the combination, with a rotary cutter-lathe, of elastic guide-rollers at each end of the same, traversing clamps at each side of the cutter-lathe, and a rotary screw-spindle for operating said clamps, substantially as set forth.

2. A tubular cutter-lathe composed of disk-shaped heads, a central guide-tube on each head, radially-adjustable cutter-plates pivoted on said heads, and cutters attached to said plates, substantially as set forth.

3. A tubular cutter-lathe provided with tubular journals at each end, disk-shaped heads, a central guide-tube at each head, radial cutter-plates pivoted adjustably to blocks in said heads, set-screws for adjusting the inner ends of the plates, and cutters supported on said cutter-plates, substantially as set forth.

4. A tubular cutter-lathe composed of disk-shaped heads, radial cutter-plates pivoted to sliding blocks in the heads, screws for adjusting said blocks, a pair of screws on each head for each plate, which screws cross each other at right angles and serve to adjust the swinging edges of the plates, substantially as set forth.

5. In a tubular cutter-lathe, the combination, with a supporting-frame, of a rotary cutter-lathe, sliding carriages at each side of the same, sliding nut-blocks in each carriage, a screw-spindle for moving the carriages, and levers for placing the nut-blocks in and out of engagement with the said spindle, substantially as set forth.

6. The combination, with a supporting-frame, of a tubular cutter-lathe, sliding clamps on the supporting-frame, a screw-spindle for moving said clamps, a shaft driven by gearing from the spindle, and gearing rotating the tubular cutter axially from said shaft, substantially as set forth.

In testimony that we claim the foregoing as our invention we have signed our names in presence of two subscribing witnesses.

EMIL ZIMMERMANN.
   AUGUST SCHMID.
   GERHARD WUNDERLE.

Witnesses:
 PAUL GOEPEL,
 CARL KARP.